US010979430B1

(12) United States Patent
Hitchcock et al.

(10) Patent No.: US 10,979,430 B1
(45) Date of Patent: Apr. 13, 2021

(54) SERVICE-INITIATED USER AUTHENTICATION VIA DELEGATED METHODS

(71) Applicant: Amazon Technologies, Inc., Seattle, WA (US)

(72) Inventors: Daniel Wade Hitchcock, Bothell, WA (US); Bharath Kumar Bhimanaik, Seattle, WA (US)

(73) Assignee: Adnazon Technologies, Inc., Seattle, WA (US)

( * ) Notice: Subject to any disclaimer, the term of this patent is extended or adjusted under 35 U.S.C. 154(b) by 360 days.

(21) Appl. No.: 15/598,251

(22) Filed: May 17, 2017

(51) Int. Cl.
*H04L 29/06* (2006.01)

(52) U.S. Cl.
CPC ...... *H04L 63/0884* (2013.01); *H04L 63/0861* (2013.01); *H04L 63/102* (2013.01); *G06F 2221/2111* (2013.01); *G06F 2221/2115* (2013.01); *H04L 63/107* (2013.01); *H04L 2463/082* (2013.01)

(58) Field of Classification Search
CPC ............... H04L 63/0884; H04L 63/102; H04L 63/0861; H04L 63/107; H04L 2463/082; G06F 2221/2111; G06F 2221/2115
USPC .......................................................... 726/7
See application file for complete search history.

(56) References Cited

U.S. PATENT DOCUMENTS

| | | | | |
|---|---|---|---|---|
| 8,166,529 B2 * | 4/2012 | O'Donoghue | ........ | H04L 63/102 713/175 |
| 8,898,749 B2 * | 11/2014 | Tohmo | .................. | H04L 9/0863 713/182 |
| 9,594,921 B2 * | 3/2017 | Cheng | ..................... | H04L 63/20 |
| 9,792,561 B2 * | 10/2017 | Konoshima | ............ | G06N 20/00 |
| 10,108,791 B1 * | 10/2018 | Masterman | ............. | G06F 21/32 |
| 10,148,644 B2 * | 12/2018 | Hosoda | ................ | H04N 1/4406 |
| 2003/0115142 A1 * | 6/2003 | Brickell | .................. | G06F 21/31 705/51 |
| 2007/0033643 A1 * | 2/2007 | Rossi | .................... | H04L 63/205 726/10 |
| 2007/0234408 A1 * | 10/2007 | Burch | ..................... | G06F 21/31 726/6 |

(Continued)

OTHER PUBLICATIONS

"Information Technology—Trusted Platform Module—Part 1: Overview," International Organization for Standardization/International Electrotechnical Commission ISO/IEC 11889-1:2009(E), May 15, 2009, 20 pages.

(Continued)

*Primary Examiner* — Samson B Lemma
*Assistant Examiner* — Abdullah Almamun
(74) *Attorney, Agent, or Firm* — Davis Wright Tremaine LLP

(57) ABSTRACT

A computer-facilitated service receives a request from a user to access resources provided by the computer-facilitated service. In response to the request, the computer-facilitated service selects an authentication method that can be performed by a remote authentication provider. The computer-facilitated service causes the remote authentication provider to perform the authentication method. In response to an authentication decision provided by the remote authentication provider, the computer-facilitated service determines whether the user has been authenticated by the remote authentication provider. If so, the computer-facilitated service fulfills the request from the user to access the resources.

20 Claims, 7 Drawing Sheets

(56) References Cited

U.S. PATENT DOCUMENTS

| | | | | |
|---|---|---|---|---|
| 2011/0265172 | A1* | 10/2011 | Sharma | H04L 63/0815 726/8 |
| 2011/0314558 | A1* | 12/2011 | Song | G06F 21/316 726/28 |
| 2013/0160144 | A1* | 6/2013 | Mok | H04W 12/06 726/29 |
| 2015/0227725 | A1* | 8/2015 | Grigg | G06F 21/31 726/7 |
| 2015/0227729 | A1* | 8/2015 | Grigg | G06F 16/24575 726/7 |
| 2015/0227730 | A1* | 8/2015 | Grigg | G06F 21/31 726/7 |
| 2015/0244696 | A1* | 8/2015 | Ma | H04L 63/08 726/4 |
| 2018/0034859 | A1* | 2/2018 | Aronowitz | H04L 63/205 |
| 2018/0069867 | A1* | 3/2018 | Grajek | H04W 12/0608 |
| 2018/0183809 | A1* | 6/2018 | Vadura | H04L 63/0815 |
| 2018/0255054 | A1* | 9/2018 | Oberheide | H04L 9/32 |

OTHER PUBLICATIONS

"Information Technology—Trusted Platform Module—Part 2: Design Principles," International Organization for Standardization/International Electrotechnical Commission ISO/IEC 11889-2:2009(E), May 15, 2009, 152 pages.

"Information Technology—Trusted Platform Module—Part 3: Structures," International Organization for Standardization/International Electrotechnical Commission ISO/IEC 11889-3:2009(E), May 15, 2009, 204 pages.

"Information Technology—Trusted Platform Module—Part 4: Commands," International Organization for Standardization/International Electrotechnical Commission ISO/IEC 11889-4:2009(E), May 15, 2009, 254 pages.

"TPM Main: Part 1 Design Principles—Specification Version 1.2—Level 2 Revision 103," Trusted Computing Group, Inc., Jul. 9, 2007, 182 pages.

"TPM Main: Part 1 Design Principles—Specification Version 1.2—Revision 116," Trusted Computing Group, Inc., Mar. 1, 2011, 184 pages.

"TPM Main: Part 2 TPM Structures—Specification Version 1.2—Level 2 Revision 103," Trusted Computing Group, Inc., Jul. 9, 2007, 198 pages.

"TPM Main: Part 2 TPM Structures—Specification Version 1.2—Revision 116," Trusted Computing Group, Inc., Mar. 1, 2011, 201 pages.

"TPM Main: Part 3 Commands—Specification Version 1.2—Level 2 Revision 103," Trusted Computing Group, Inc., Jul. 9, 2007, 330 pages.

"TPM Main: Part 3 Commands—Specification Version 1.2—Revision 116," Trusted Computing Group, Inc., Mar. 1, 2011, 339 pages.

* cited by examiner

SERVICE-INITIATED USER AUTHENTICATION VIA DELEGATED METHODS

BACKGROUND

Computer-facilitated services and other services often utilize a variety of methods to authenticate users requesting access to resources provided by these services. For instance, in response to a request from a user, a server of a computer-facilitated service issues a challenge to the user. The user provides a response to the server, which evaluates the response and determines whether the user can be authenticated. However, it may be difficult for these services to utilize alternative authentication methods that may be superior to options that can be presented by these services and that are available through alternative services and devices utilized by users. Further, implementing these alternative authentication methods may be costly to the organizations that provide the computer-facilitated services and the other services.

BRIEF DESCRIPTION OF THE DRAWINGS

Various techniques will be described with reference to the drawings, in which.

DETAILED DESCRIPTION

Figure 1:
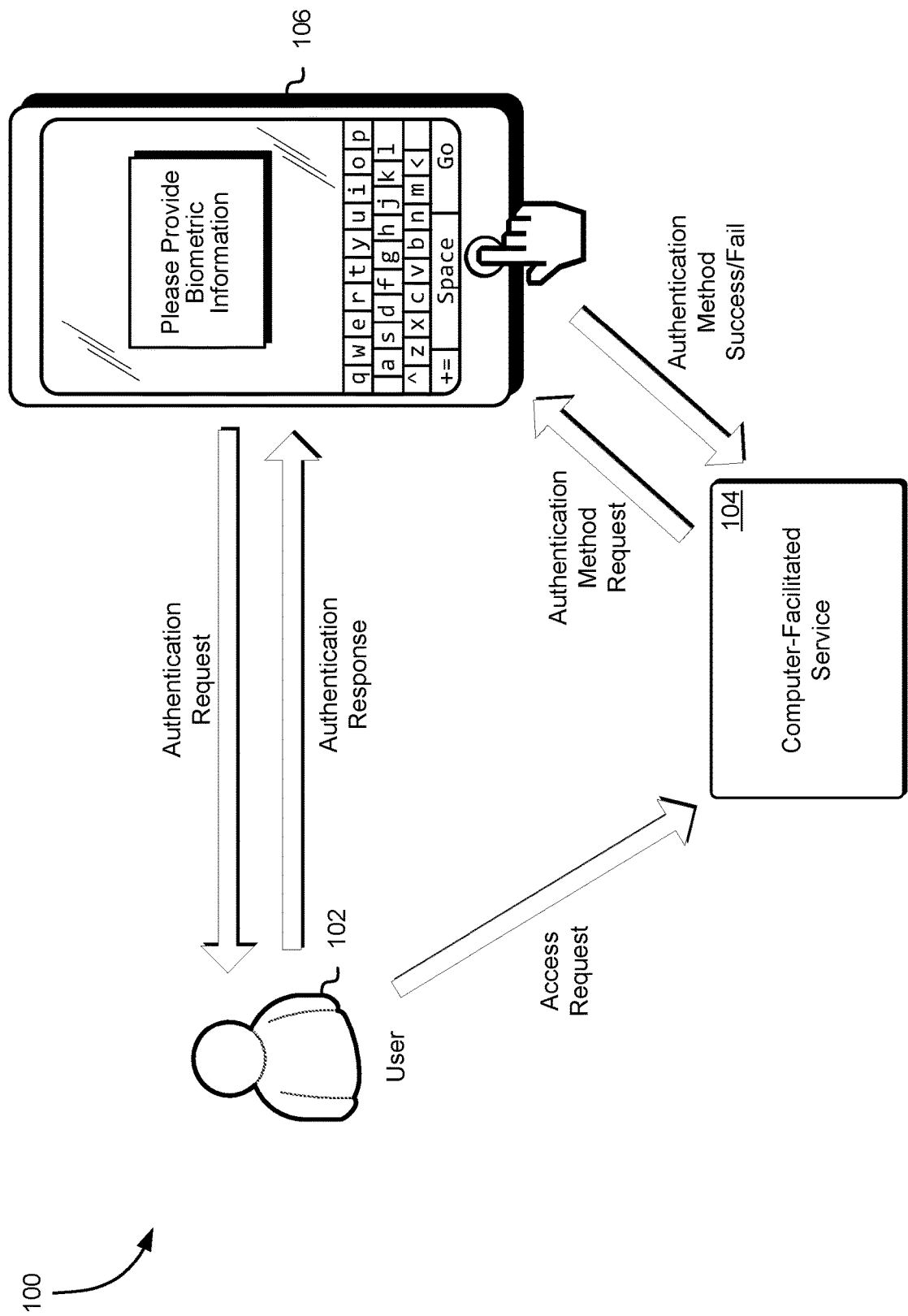
FIG. 1 shows an illustrative example of an environment in which various embodiments can be implemented.

This patent disclosure relates to selecting authentication methods to be performed by a user's computing device or another service and used to determine whether to enable user access to resources provided by a computer-facilitated service. In an example, a computer-facilitated service receives a request from a user to access a resource provided by the computer-facilitated service. The user may access the computer-facilitated service, over a communications network, using a computing device (e.g., desktop computer, tablet computer, smartphone, etc.) or through another service, such as a social media service, an online retail service, and the like. In response to the request from the user, the computer-facilitated service may prompt the user to provide information that can be used to perform an initial authentication of the user. For example, the computer-facilitated service may prompt the user to provide its credentials, which the computer-facilitated service may use to determine if the user can be authenticated. If the user can be authenticated by the computer-facilitated service, the computer-facilitated service may determine whether additional authentication is required in order to enable the user to access the requested resources. For instance, the computer-facilitated service may require multiple forms of authentication in order for the user to access the requested resources.

In an example, if the computer-facilitated service determines that additional authentication of the user is required, the computer-facilitated service can access the user's customer profile to identify any computing devices utilized by the user, as well as any other services that the user may utilize for other purposes. The user's customer profile may specify authentication methods that may be performed by each computing device and service detailed in the customer profile, as well as a rating indicating a level of trust the computer-facilitated service may have for each authentication method. Using the customer profile, the computer-facilitated service may select an authentication method and the computing device or service that is to perform the selected method to authenticate the user. The computer-facilitated service may transmit a request to the selected computing device or other service utilized by the user to perform the selected authentication method and to provide an authentication response to the computer-facilitated service.

In response to the request from the computer-facilitated service to perform the selected authentication method, the user's computing device or other service may determine whether user authentication may be performed using the selected method. For example, if the selected authentication method involves obtaining and analyzing biometric information for the user, the computing device or other service may determine whether the biometric information may be obtained and, if so, whether it may be analyzed to authenticate the user. In some examples, if the computing device or other service determines that it cannot perform the selected authentication method, the computing device or other service may select another authentication method that may be performed in order to locally (relative to the computing device or other service) authenticate the user. The user's computing device or other service may prompt the user to provide information usable to authenticate the user locally. In response to receiving the authentication information from the user, the user's computing device or other service may determine whether the user may be authenticated and generate an authentication decision. The user's computing device or other service may provide the authentication decision to the computer-facilitated service for processing.

In an example, the computer-facilitated service evaluates the authentication decision from the user's computing device or from the other service utilized by the user to determine whether the user can be successfully authenticated and granted access to the requested resources provided by the computer-facilitated service. For instance, the computer-facilitated service may determine if the authentication decision provided by the user's computing device or other service utilized by the user is authentic. This may include evaluating a digital signature of the computing device or the other service which the computer-facilitated service may verify to determine that the authentication decision is authentic and was generated by the computing device or other service. In some examples, if an alternative authentication method was used by the computing device or the other service, the computer-facilitated service determines whether to use the authentication decision for authenticating the user. For instance, the computer-facilitated service may calculate a score for the alternative authentication method, which may be calculated based on the difficulty in spoofing authentication information using the method, known vulnerabilities, cryptographic complexity, and the like. If the computer-facilitated service determines that the alternative authentication method is acceptable or the user's computing device or other service utilized the prescribed authentication method, the computer-facilitated service may utilize the authentication decision from the user's computing device or other service to authenticate the user.

In this manner, the computer-facilitated service may leverage the authentication methods utilized by a user's computing device or by another service utilized by the user to obtain an authentication decision that can be used to authenticate the user for accessing resources provided by the computer-facilitated service. In addition, the techniques described and suggested in this disclosure enable additional technical advantages. For instance, because the computer-facilitated service selects the authentication method that is to be executed by the user's computing device or by another service utilized by the user, the computer-facilitated service may maintain hierarchical control over authentication of the user. Further, because the computer-facilitated service evaluates the authentication decision generated by the user's computing device or other service, the computer-facilitated service may ensure that a secure method of authentication is utilized without ceding control of the authentication process to other entities.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a user 102 initiates a request using a user interface of an input device, which causes the input device to transmit a request to a computer-facilitated service 104 to access one or more resources provided by the computer-facilitated service 104. For instance, the computer-facilitated service 104 may enable customers to access a website to access certain data, purchase items from an online marketplace, access an e-mail account, and the like. The computer-facilitated service 104 may receive the request and obtain information for authenticating the user 102 as a customer of the computer-facilitated service 104. For instance, the request may include identifying information for the user 102, which may include a set of user credentials for the user 102, Internet Protocol (IP) address for the user 102, one or more cookies, and the like. This identifying information may be used to authenticate the user 102 on the server-side (e.g., within the systems of the computer-facilitated service 104). In some embodiments, the user 102 is a human entity. In other embodiments, the user 102 is a non-human entity (e.g., automated processes executing on computing devices, other computing devices, devices programmed with artificial intelligence, etc.).

If the computer-facilitated service 104 is unable to authenticate the user 102 utilizing the identifying information provided in the request, the computer-facilitated service 104 may determine whether additional authentication is required or if the request is to be denied. For instance, if the identifying information provided by the user 102 does not correspond to a valid customer of the computer-facilitated service 104, the computer-facilitated service 104 may deny the request. Similarly, if the user 102 has provided erroneous credential information a number of times, and this number exceeds a threshold value, the computer-facilitated service 104 may deny the user's request to access the one or more resources provided by the computer-facilitated service 104. In some instances, if the user 102 has provided erroneous credential information a number of times, and this number does not exceed the threshold value, the computer-facilitated service 104 may require additional authentication information usable for authenticating the user in order to determine whether to enable the user to access the requested resources.

In an embodiment, if the computer-facilitated service 104 successfully authenticates the user 102 utilizing the identifying information provided in the request, the computer-facilitated service 104 accesses the user's customer profile to determine whether additional authentication is to be performed in order to enable the user 102 to access the requested resources. For instance, the user 102 may specify, in its customer profile, that additional authentication may be needed in order to access certain resources through the computer-facilitated service 104. This may include resources that include sensitive information or other data that necessitates additional security measures to ensure that only certain entities may access the data. Similarly, the computer-facilitated service 104 may determine that, for certain resources, additional authentication is required before a user 102 is granted access to these resources. Thus, if a user 102 submits a request to access such a resource, the computer-facilitated service 104 may determine that additional authentication is needed in order to determine whether the user 102 may be granted access to the requested resource. In some embodiments, the computer-facilitated service 104 can update the user's customer profile to specify that additional authentication is needed in response to a notification from the user 102 or another entity that the user's credential information usable to access the computer-facilitated service 104 has been compromised.

The user's customer profile may specify the computing devices utilized by the user 102, as well as any other computing services that the user 102 may utilize. For instance, the user's customer profile may specify that the user 102 maintains a smartphone, a desktop computer, and a laptop computer. Additionally, the user's customer profile may specify that the user 102 is a customer of a social media service, a database service, a data storage service, and the like. In some embodiments, the computer-facilitated service 104 maintains, in the user's customer profile or in a separate database, information usable to determine the one or more authentication methods utilized by the computing devices and other services utilized by the user 102. For example, the computer-facilitated service 104 may specify, in the customer profile or in the database, the operating system utilized by each of the user's computing devices, as well as any software and hardware characteristics of these computing devices. The software and hardware characteristics may include security software installed on each computing device, peripheral devices installed on each computing device, information usable to determine whether the security software and/or peripheral devices are enabled, and the like. The computer-facilitated service 104 may also specify the authentication methods utilized by each computing device to enable user access to the computing device or to various features of the computing device. These authentication methods may include, but are not limited to, biometric information (e.g., voice recognition, facial recognition, retinal and/or iris scans, finger print recognition, etc.), one-time passwords (e.g., textual, non-textual, etc.), geolocation, multi-factor authentication, out-of-band authentication, and the like. Additionally, the computer-facilitated service 104 may specify, in the customer profile or in the database, the authentication methods utilized by other services utilized by the user 102. These authentication methods may include additional, fewer, or alternative methods to those utilized by the computing devices, as described above. While computing devices and other services are utilized throughout the present disclosure for the purpose of illustration, other entities may be used in conjunction with authentication methods that may be performed by these other entities. For instance, the user's customer profile may specify an authentication method whereby a person or an unmanned vehicle (e.g., unmanned aerial vehicle, self-driving automobile, etc.) performs or at least participates in authentication of the user 102 at a physical location (e.g., address or global positioning service coordinates) specified in the user's customer profile. The person or unmanned vehicle may authenticate the user 102 locally and provide an authentication decision to the computer-facilitated service 104 via an electronic or physical message, perhaps asynchronously relative to the process that triggered the authentication.

If the computer-facilitated service 104 determines that additional authentication of the user 102 is needed in order to determine whether the user 102 is to be granted access to the requested resources, the computer-facilitated service 104 may evaluate the user's customer profile to identify the computing devices and other services utilized by the user 102. Further, the computer-facilitated service 104 may determine, based at least in part on the identified computing devices and other services utilized by the user 102, the additional authentication methods to be used to obtain an additional authentication decision for the user 102. For example, as illustrated in FIG. 1, the computer-facilitated service 104 may select a user's computing device 106 that may perform an authentication method selected by the computer-facilitated service 104. Further, the computer-facilitated service 104 may select an authentication method that is to be utilized by the user's computing device 106 for authentication of the user 102.

In some embodiments, the computer-facilitated service 104 transmits a request to one or more computing devices and/or other services utilized by the user 102 to gather environmental measurements related to the surrounding environment in which the user 102 is in. The environmental measurements may include facial recognition details, sound levels, global positioning system (GPS) coordinates, light intensity, motion detection characteristics and the like. The computer-facilitated service 104 may obtain these environmental measurements from the one or more computing devices and/or other services or from other devices or services in proximity of the user 102 (e.g., devices or services under the control of other entities, etc.). The computer-facilitated service 104 may utilize the environmental measurements as input to one or more functions (classifiers) to select an authentication method that is to be used by the user's computing device 106 or other service for authentication of the user 102. For instance, the computer-facilitated service 104 may organize the received environment measurements into one or more vectors, which may be analyzed, through the one or more functions to identify an authentication method that has a higher probability of being performed successfully within the user's environment.

The computer-facilitated service 104 may transmit a request to the user's computing device 106 to perform the selected authentication method. In some instances, the computer-facilitated service 104 may transmit a notification to the user 102 to indicate that additional authentication is required, as well as the method selected for authentication. This may cause the user 102 to access the computing device 106 to provide its authentication information in conformity with the selected authentication method. Alternatively, in response to the request to perform the selected authentication method, the computing device 106 may prompt the user 102 to provide authentication information usable by the computing device 106 to determine whether the user 102 can be successfully authenticated. As an illustrative example, if the computer-facilitated service 104 has requested that the computing device 106 perform authentication of the user 102 using biometric information, the computing device 106 may prompt the user 102, via a user interface of the computing device 106, to provide its biometric information.

In response to receiving the user's identifying information or other information usable to authenticate the user 102, the computing device 106 or other service may determine whether the user can be successfully authenticated locally (e.g., at the computing device 106). For instance, if the user 102 provides a unique password or biometric information in response to the request from the computing device 106 to provide identifying information usable for authentication, the computing device 106 may evaluate the identifying information to determine whether it corresponds to known values for the user 102. For example, the computing device 106 may determine whether a provided password matches a password of the user 102. Alternatively, if the user 102 provided biometric information as its identifying information, the computing device 106 may organize the biometric information into one or more vectors, which may be analyzed, through one or more functions to determine whether the biometric information corresponds to the user 102. If the computing device 106 determines that the user has been successfully authenticated, the computing device 106 may transmit a notification to the computer-facilitated service 104 to indicate that the computing device 106 has authenticated the user 102. Alternatively, if the computing device 106 is unable to authenticate the user 102, the computing device 106 may transmit a notification to the computer-facilitated service 104 to indicate that user 102 could not be authenticated and that the request to access the resources of the computer-facilitated service 104 should be denied.

In some embodiments, the computing device 106 or other service selects an alternative authentication method if the computing device 106 or other service determines that the authentication method selected by the computer-facilitated service 104 cannot be performed. For example, if the computing device 106 determines that one or more peripheral devices usable to obtain biometric information are disabled, and the selected method involves authenticating the user 102 based at least in part on its biometric information, the computing device 106 may select an alternative authentication method. Similarly, if the authentication request is transmitted to another service, and the other service determines that the user's account with that service has been compromised (e.g., the user's credential information for the other service has been compromised), the other service may select an alternative authentication method that involves using multi-factor authentication or other secure methods for authenticating the user 102.

The computing device 106 or other service may transmit its authentication decision to the computer-facilitated service 104 along with information usable to prove that the authentication decision was generated by the computing device 106 or other service. For example, a service may digitally sign the authentication decision using a cryptographic key issued by a certificate authority trusted by the computer-facilitated service 104 and the other service. Thus, the computer-facilitated service 104 may interact with the certificate authority to verify the authenticity of the authentication decision provided by the other service. If the authentication decision is generated by a user's computing device 106, the computing device 106 may utilize its Trusted Platform Module (TPM) to digitally sign the authentication decision and may provide its digital certificate, which the computer-facilitated service 104 may use to verify that the authentication decision from the computing device 106 is authentic. The TPM may include a memory subsystem, including a main random access memory (RAM) for storage of instructions and data during program execution and a read only memory (ROM), in which fixed cryptographic information may be stored, such as a hardware secret stored securely within the device 106 so as to be non-exportable (i.e., inaccessible through any call to the TPM). The TPM may operate wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 106 may also store cryptographic keys in RAM and/or processor registers for temporary cryptographic processing. The one or more cryptographic processors may be used to perform cryptographic operations in the device and may include a random number generator, SHA-2 or other hash generator and an encryption-decryption signature engine.

In response to receiving the authentication decision from the computing device 106 or the other service, the computer-facilitated service 104 may determine whether the authentication decision originated from computing device 106 or the other service. As mentioned above, the authentication decision may be digitally signed by the computing device 106 using its TPM, which may also provide its digital certificate for verification of the digital signature. Similarly, the authentication decision may be digitally signed by another service using a cryptographic key provided by a certificate authority. The computer-facilitated service 104 may utilize a corresponding cryptographic key to verify that the digital signature is authentic. If the computer-facilitated service 104 cannot verify the authenticity of the authentication decision, the computer-facilitated service 104 may reject the authentication decision and deny the user's request to access the one or more requested resources provided by the computer-facilitated service 104.

If the computer-facilitated service 104 determines that the authentication decision from the computing device 106 or other service is authentic, the computer-facilitated service 104 may use the authentication decision to determine whether the user 102 has been authenticated by the computing device 106 or other service. For instance, if the authentication decision specifies that the user 102 cannot be successfully authenticated, the computer-facilitated service 104 may deny the user's request to access the one or more resources of the computer-facilitated service 104. However, if the authentication decision specifies that the user 102 has been successfully authenticated by the computing device 106 or the other service, the computer-facilitated service 104 may grant the user's request.

In some embodiments, if the authentication decision was generated using a method other than the method selected by the computer-facilitated service 104, the computer-facilitated service 104 may determine whether to accept the authentication decision provided by the computing device 106 or the other service. For instance, the computer-facilitated service 104 may identify and evaluate the authentication method utilized by the computing device 106 or other service. The authentication decision may specify, as metadata of the notification including the authentication decision, information usable to identify the authentication method used, as well as the inputs provided by the user 102 to reach the authentication decision (e.g., biometric information, text entries, interactions with the computing device 106 or other service, etc.). The computer-facilitated service may evaluate the authentication method utilized by the computing device 106 or the other service against other known authentication methods to determine whether to accept the authentication decision. For example, if the authentication method utilized is subject to numerous vulnerabilities or otherwise is not rigorous enough to prevent false positives, the computer-facilitated service 104 may reject the authentication decision and deny the user's request. However, if the computer-facilitated service 104 determines that the authentication method utilized by the computing device 106 or other service satisfies one or more criteria established by the computer-facilitated service 104 (e.g., has few vulnerabilities, high success rate in preventing false positives, etc.), the computer-facilitated service 104 may accept the authentication decision and utilize the authentication decision to determine whether to fulfill the user's request.

Figure 2:
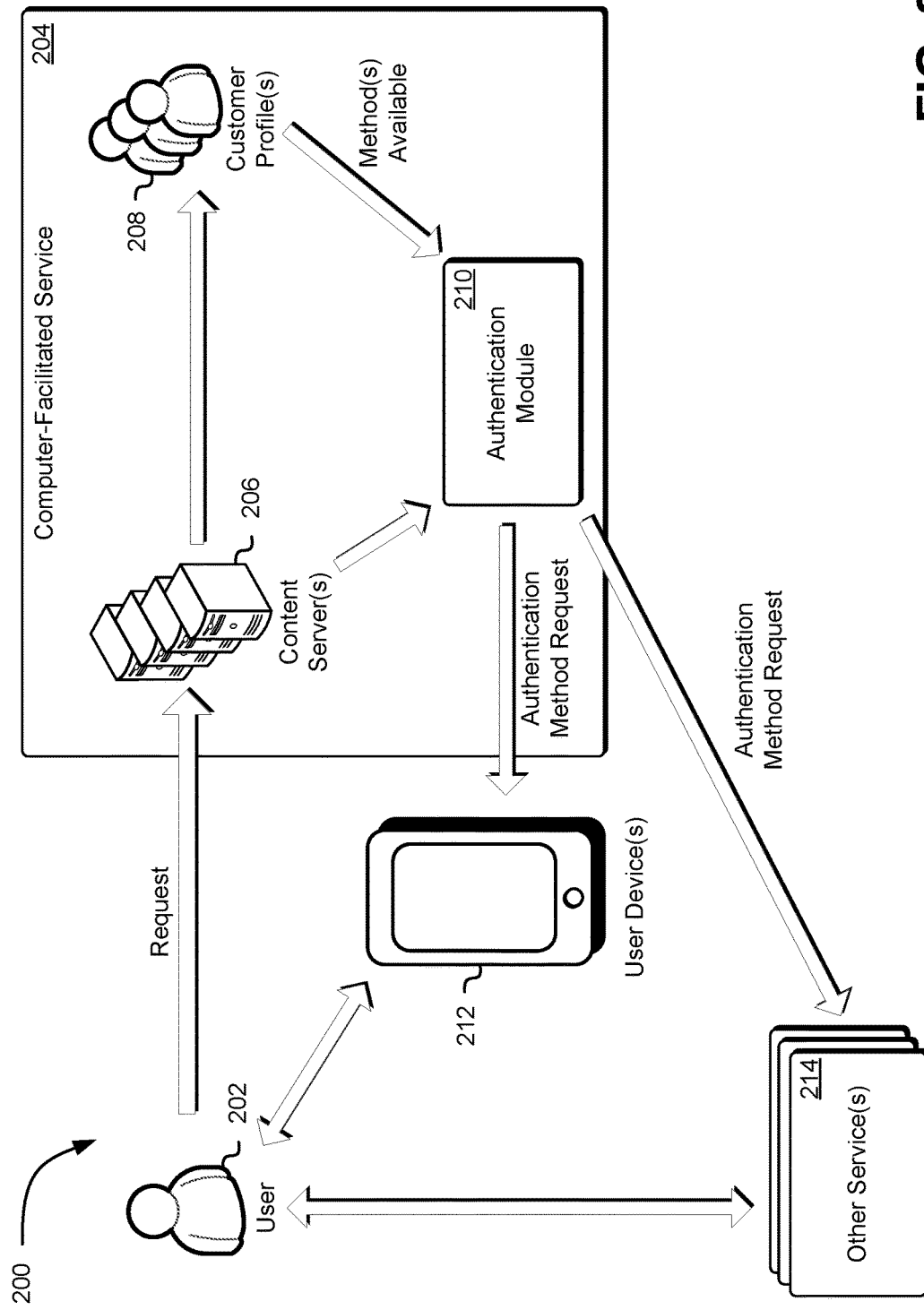
FIG. 2 shows an illustrative example of an environment in which a computer-facilitated service transmits a request to a user's computing device or to another service utilized by the user to authenticate the user using a method selected by the computer-facilitated service in accordance with at least one embodiment.

As noted above, in response to a request from a user to access one or more resources of a computer-facilitated service, the computer-facilitated service may select a computing device or other service utilized by the user that can be used to authenticate the user. Additionally, based at least in part on the computing device or service selected, the computer-facilitated service may select an authentication method to be used by the computing device or other service to authenticate the user. The computing device or other service may use the authentication method selected to generate an authentication decision that can be transmitted to the computer-facilitated service. The computer-facilitated service may use this authentication decision to determine whether to fulfill the user's request. Accordingly, FIG. 2 shows an illustrative example of an environment 200 in which a computer-facilitated service 204 transmits a request to a user's computing device 212 or to another service 214 utilized by the user 202 to authenticate the user 202 using a method selected by the computer-facilitated service 204 in accordance with at least one embodiment.

In the environment 200, a user 202 transmits a request to one or more content servers 206 of a computer-facilitated service 204 to access one or more resources provided by the computer-facilitated service 204. The request from the user 202 may include identifying information, including credential information that may be used by an authentication provider of the computer-facilitated service 204, such as an authentication module 210, to authenticate the user 202. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like. In response to the request from the user 202, the one or more content servers 206 may transmit the provided credential information to an authentication module 210 of the computer-facilitated service 204.

The authentication module 210 may include one or more computer systems of the computer-facilitated service 204 that may evaluate credential information provided by users to determine whether these users can be authenticated and granted access to the resources provided by the computer-facilitated service 204. It should be noted that while the authentication module 210 is illustrated as being a component of the computer-facilitated service 204, the authentication module 210 may be implemented as a stand-alone service distinct from the computer-facilitated service 204. In some embodiments, the authentication module 210 accesses a customer profile datastore 208 to identify a customer profile corresponding to the user 202 and to obtain information usable to determine whether the credential information provided by the user 202 is valid and corresponds to the user 202. If, using the user's credential information and user's customer profile, the authentication module 210 determines that the user 202 cannot be successfully authenticated, the authentication module 210 may transmit a notification to the content servers 206 to indicate that the request is to be denied. The one or more content servers 206 may transmit a notification to the user 202 to indicate that the request has been denied.

In some embodiments, if the authentication module 210 determines that the credential information provided by the user 202 is valid or that an alternative method of authentication may be used if the provided credential information is invalid, the authentication module 210 can evaluate the user's customer profile to identify additional authentication providers that may be used to authenticate the user 202. For example, a user's customer profile may specify one or more computing devices 212 and other services 214 utilized by the user 202, as well as information usable to determine the authentication methods utilized by these one or more computing devices 212 and other services 214. The user's customer profile may specify, for example, the operating system, software, and hardware of a computing device 212 utilized by the user 202, as well as information that may be used by the authentication module 210 to communicate with the computing device 212. Similarly, the user's customer profile may specify, for each other service 214 that the user 202 utilizes, the authentication methods utilized by the other service 214 to enable the user 202 to access the other service 214. The information regarding the user's computing devices 212 and other services 214 may be provided by the user 202 as part of a registration process for the computer-facilitated service 204, whereby the user 202 may be instructed to access the computer-facilitated service 204 using each computing device 212. Further, the user 202 may indicate, in the registration process, any other services 214 that the user 202 utilizes.

If additional authentication of the user 202 is needed, the authentication module 210 may select another authentication provider that may be used to authenticate the user 202. This may include selecting a computing device 212 or other service 214 that is to authenticate the user 202. Further, in some embodiments, the authentication module 210 selects the authentication method that is to be used by the other authentication provider to authenticate the user 202. For instance, if the authentication module 210 selects a user's computing device 212 for authentication of the user 202, the authentication module 210 may evaluate the authentication methods utilized by the selected computing device 212 and select an authentication method that may be executed by the computing device 212. Similarly, if the authentication module 210 selects another service 214 for authentication of the user 202, the authentication module 210 may evaluate the authentication methods utilized by the selected other service 214 and select an authentication method that may be executed by the other service 214. The authentication module 210 may transmit a request to the selected computing device 212 or other service 214 to perform the selected authentication method and to provide an authentication decision to the authentication module 210. In some embodiments, the authentication module 210 utilizes a confidence score, in combination with the user's customer profile, to determine one or more authentication methods to be used for authentication of the user 202. For instance, each authentication method specified in the user's customer profile may be designated a score that designates the reliability and/or efficiency of the authentication method for use in authenticating the user 202. Based at least in part on the user's request, the authentication module 210 may determine a confidence score threshold that is to be satisfied in order to authenticate the user 202. The authentication module 210 may select one or more authentication methods that, as a result of being used, may satisfy this confidence score threshold.

If the authentication module 210 selects a computing device 212 for authentication of the user 202, the authentication module 210 may transmit a request to the selected computing device 212 to perform the authentication method selected by the authentication module 210. The request may include executable instructions that may be executed by an authentication provider of the computing device 212 to prompt the user 202 to provide information usable by the authentication provider to authenticate the user 202. For example, in response to receiving the request from the authentication module 210, the computing device 212 may prompt the user 202, via a graphical user interface (GUI) or other interface of the computing device 212, to provide authentication information. As an illustrative example, if the selected authentication method involves analyzing biometric information to determine whether this biometric information corresponds to the user 202 that submitted the request to the computer-facilitated service 204, the computing device 212 may activate one or more peripheral devices that may be used to obtain the biometric information. Further, the computing device 212 may prompt the user 202 to utilize the peripheral devices to provide its biometric information. This may include asking the user 202 to use a fingerprint scanner on the computing device to provide a fingerprint, placing a camera near the eye of the user 202 to perform a retina or iris scan, taking a picture of the user's face using the camera of the computing device 212 to obtain a facial image of the user 202 for use in a facial recognition scheme, and the like. Alternatively, if the authentication method involves obtaining a password or other code from the user 202, the computing device 212 may prompt the user 202 to enter the password or other code and activate a touchscreen of the computing device 212 to enable the user 202 to enter the password or other code.

In response to receiving authentication information from the user 202, the authentication provider of the computing device 212 may evaluate the authentication information to determine whether the user 202 can be authenticated successfully. For instance, if the prescribed authentication method involves analyzing a user's biometric information, the authentication provider of the computing device 212 may organize the biometric information from the user 202 into one or more vectors, which may be analyzed, through one or more functions to determine whether the biometric information corresponds to the user 202. If the authentication provider of the computing device 212 determines that the user 202 has been successfully authenticated, the computing device 212 may transmit a notification to the authentication module 210 to indicate that the authentication provider of the computing device 212 has authenticated the user 202. Alternatively, if the authentication provider of the computing device 212 is unable to authenticate the user 202, the computing device 212 may transmit a notification to the authentication module 210 to indicate that user 202 could not be authenticated and that the request to access the resources of the computer-facilitated service 204 should be denied.

In a similar fashion, if the authentication module 210 selects an authentication method that is to be executed by another service 214 utilized by the user 202, the authentication module 210 may transmit a request to the authentication provider of the other service 214 to perform the selected authentication method. In response to the request from the authentication module 210, the authentication provider of the other service 214 may prompt the user 202, via a user interface provided by the other service 214, to provide authentication information usable to authenticate the user 202. For example, if the user 202 utilizes a computing device to access the other service 214, the other service 214 may transmit data that may be used by the computing device to provide a GUI that may be used to prompt the user 202 to provide its authentication information. Further, the other service 214 may utilize the computing device itself to collect the authentication information, which the other service 214 may obtain from the computing device and analyze to determine whether the user 202 may be authenticated. The authentication provider of the other service 214 may transmit a notification to the authentication module 210 to indicate the authentication decision regarding the user 202 reached by the authentication provider.

In some embodiments, the authentication provider of the computing device 212 or of the other service 214 digitally signs the authentication decision provided to the authentication module 210. For example, the computing device 212 may utilize a TPM installed on the computing device 212 to digitally sign the authentication decision and may provide its digital certificate, which the authentication module 210 may use to verify that the authentication decision from the computing device 212 is authentic. If the authentication decision is generated by the authentication provider of the other service 214, the authentication provider may utilize a cryptographic key provided by a certificate authority trusted by the other service 214 and the authentication module 210, to digitally sign the authentication decision. In response to receiving the digitally signed authentication decision from the computing device 212 or from the other service 214, the authentication module 210 may verify the digital signature to ensure that the authentication decision was generated by the authentication provider of the computing device 212 or of the other service 214. The authentication provider of the computing 212 or of the other service 214 may be a remote authentication provider that is a third-party to the computer-facilitated service 204. For instance, in some embodiments, the remote authentication provider is separate and distinct from the computer-facilitated service 204.

Based at least in part on the authentication decision received from the computing device 212 or from the other service 214, the authentication module 210 may determine whether the user 202 can be successfully authenticated. For instance, if the authentication decision specifies that the user 202 could not be successfully authenticated, the authentication module 210 may transmit a notification to the one or more content servers 206 to indicate that the request from the user 202 is to be denied. Alternatively, if the authentication decision indicates that the user 202 has been successfully authenticated by the authentication provider of the computing device 212 or other service 214, the authentication module 210 may determine whether additional authentication of the user 202 is required or if the request from the user 202 may be fulfilled. If additional authentication is required, the authentication module 210 may select another method of authentication and transmit a request to the computing device 212, to the other service 214, or to other devices and services to perform the selected authentication method. Alternatively, if the authentication module 210 determines that the user 202 has been authenticated and no further authentication is required, the authentication module 210 may transmit a notification to the one or more content servers 206 to fulfill the user's request.

In some embodiments, in response to the request from the authentication module 210 to perform a selected authentication method, the computing device 212 or other service 214 determines that the selected authentication method cannot be executed and selects an alternative authentication method to be performed. For example, if the authentication provider of the computing device 212 determines that one or more peripheral devices of the computing device 212 are disabled, damaged, or compromised (e.g., as specified by the computing device 212 itself or by a third party) and thus cannot be used to obtain biometric information, the authentication provider may select an alternative authentication method that does not involve collection of biometric information via the disabled peripheral devices. This may include collecting passwords, codes, challenge responses, and the like. The authentication provider may provide information regarding the circumstances necessitating selection of an alternative authentication method, the authentication method utilized, and the authentication decision reached by the authentication provider using the alternative authentication method.

The authentication module 210 may evaluate the information provided by the authentication provider of the computing device 212 or other service 214 to determine whether to accept the authentication decision obtained using the alternative authentication method selected by the computing device 212 or other service 214. For instance, the authentication decision may specify, as metadata of the notification including the authentication decision, information usable to identify the authentication method used, as well as the inputs provided by the user 202 to reach the authentication decision. The authentication module 210 may evaluate the authentication method utilized by the computing device 212 or the other service 214 against other known authentication methods to determine whether to accept the authentication decision. For example, if the authentication method utilized is subject to numerous vulnerabilities or otherwise is not rigorous enough to prevent false positives, the authentication module 210 may reject the authentication decision and deny the user's request. However, if authentication module 210 determines that the authentication method utilized by the computing device 212 or other service 214 satisfies one or more criteria established by the authentication module 210, the authentication module 210 may accept the authentication decision and utilize the authentication decision to determine whether to fulfill the user's request.

Figure 3:
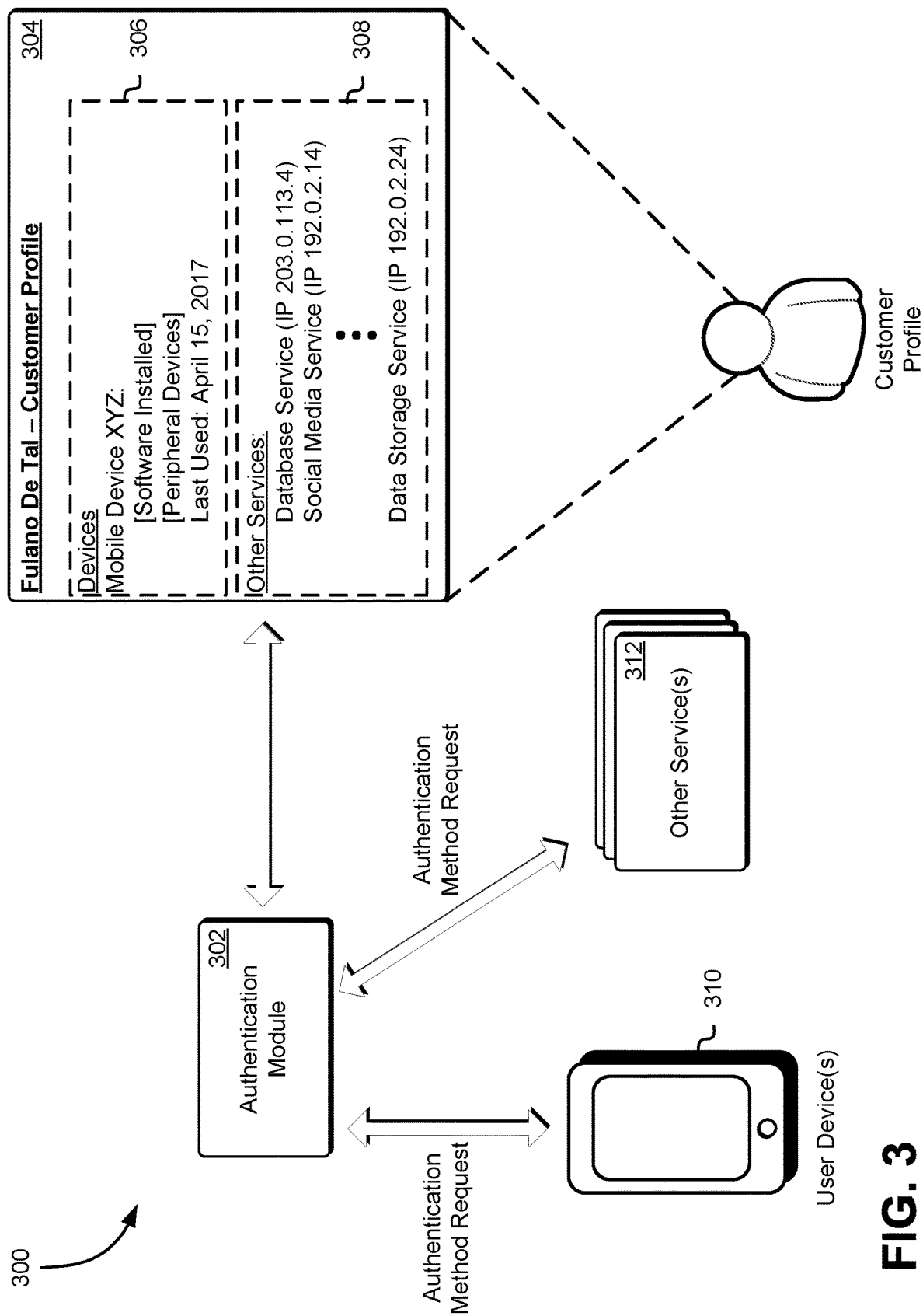
FIG. 3 shows an illustrative example of an environment in which an authentication module evaluates a customer profile of a user to determine a method of authentication to be executed by the user's computing device or by another service utilized by the user in accordance with at least one embodiment.

As noted above, an authentication module of a computer-facilitated service may access a user's customer profile to identify any computing devices and other services utilized by the user. The authentication module may select, from the user's customer profile, a computing device or other service that may execute an authentication method selected by the authentication module for authentication of the user. The authentication module may transmit a request to the selected computing device or other service to execute the selected authentication method and to provide an authentication decision that can be used by the authentication module to determine whether the user's request may be fulfilled. Accordingly, FIG. 3 shows an illustrative example of an environment 300 in which an authentication module 302 evaluates a customer profile 304 of a user to determine a method of authentication to be executed by the user's computing device 310 or by another service 312 utilized by the user in accordance with at least one embodiment.

In the environment 300, an authentication module 302 accesses a customer profile 304 of a user to identify the computing devices 310 and other services 312 utilized by a user. The authentication module 302 may access the customer profile 304 in response to a request from one or more content servers of a computer-facilitated service to determine whether to fulfill a user's request to access one or more resources provided by the computer-facilitated service. The request from the one or more content servers may include identifying information provided by the user, which may be used by the authentication module 302 to utilize its authentication provider to perform an initial authentication of the user. Alternatively, the request may include no additional information except information usable to identify the user's customer profile 304. For instance, the request may specify the username of the user.

In response to the request, the authentication module 302 may access the user's customer profile 304. If the request included identifying information that may be used to perform an initial authentication of the user, the authentication module 302 may access the user's customer profile 304 to obtain information usable to determine whether the identifying information provided by the user is valid and corresponds to the user. If, using the user's identifying information and the user's customer profile 304, the authentication module 302 determines that the user cannot be successfully authenticated, the authentication module 302 may transmit a notification to the content servers to indicate that the request is to be denied. This may cause the one or more content servers to transmit a notification to the user to indicate that the request has been denied.

In some embodiments, if the authentication module 302 determines that the identifying information provided by the user is valid or that an alternative method of authentication may be used if the provided credential information is invalid, the authentication module 302 can evaluate the user's customer profile 304 to identify additional authentication providers that may be used to authenticate the user. For example, a user's customer profile 304 may specify a computing devices field 306 that specifies one or more computing devices utilized by the user. For instance, the computing devices field 306 may include an entry for each computing device 310 utilized by the user. Each entry may specify an identifier for the corresponding computing device 310, as well as the hardware and software configuration of the computing device 310. For example, the entry may specify the operating system of the computing device 310, the authentication providers installed on the computing device 310, the peripheral devices installed on the computing device 310, whether the computing device 310 includes a TPM or other cryptographic module, and the like. Further, the entry may specify the authentication methods available to the computing device 310 for authenticating the user via the authentication providers of the computing device 310. In some instances, the computing devices field 306 may also specify a timestamp corresponding to a time at which the user of the computing device 310 last utilized the computing device 310 to access the computer-facilitated service or for authentication purposes.

In some embodiments, the computing devices field 306 specifies, for each authentication method that may be performed by the computing device 310, a score that can be used by the authentication module 302 to select the one or more authentication methods to be performed by the computing device 310 and/or other services 312. The score may be calculated using machine learning techniques, such as supervised learning techniques. A machine learning algorithm may, at any time, utilize one or more sample vectors to perform one or more simulations to determine whether the functions utilized by the authentication module 302 are producing correct and accurate results and/or to refine the one or more functions utilized by the authentication module 302 to produce accurate scores for the various authentication methods that may be available and specified in the customer profile 304. For instance, during initialization of the machine learning algorithm, the computer-facilitated service may provide the machine learning algorithm with one or more sample vectors and analytical results (e.g., desired outcomes) that should be obtained based at least in part on these one or more sample vectors. The machine learning algorithm, based at least in part on this exercise, may adjust the functions utilized by the authentication module 302 to analyze the vectors corresponding to the authentication methods utilized by the computing device 310 to authenticate a user.

The machine learning algorithm may receive input from one or more analysts employed by the computer-facilitated service to analyze the results from the one or more analyses performed by the authentication module 302 through use of the one or more functions described above. For instance, an analyst may review the outcomes of each authentication method utilized by the computing device 310 and the one or more vectors generated by the authentication module 302 to determine a score for the authentication method. For example, if the authentication method is particularly cumbersome for users and/or susceptible to attack, the analyst may adjust the functions to result in a score for the authentication method that may reduce the likelihood that the authentication module 302 would select the authentication method. Alternatively, if the authentication method is highly secure and performance of the method is not difficult for the user and/or the computing device 310, the analyst may adjust the functions to result in a score for the authentication method that may increase the likelihood that the authentication module 302 would select the authentication method. The analyst may provide his/her input for use in refining a function used to classify vector input for calculating the score for each authentication method. The vector of measurements corresponding to the review performed by the analyst and the desired outcome corresponding to the analyst's input may be used by the machine learning algorithm to update the function used to classify vector inputs. Such may be performed by multiple analysts and/or using multiple vector inputs to provide the machine learning algorithm a sufficient number of sample vector inputs and desired outputs. The machine learning algorithm may adjust the one or more functions used by the authentication module 302 to increase the likelihood that the desired result is obtained in future analyses of the authentication methods available.

Similarly, the customer profile 304 may specify a services field 308 that specifies one or more other services 312 utilized by the user. The services field 308 may include an entry for each other service 312 utilized by the user. Each entry may specify an identifier for the corresponding other service 312, as well as network addresses (e.g., Internet Protocol (IP) addresses, etc.) of the other service 312 that can be used by the authentication module 302 to establish a communications channel with the other service 312. Additionally, an entry in the services field 308 may specify the authentication methods utilized by authentication providers of the other service 312, as well as other information that may be used to determine the security level of the other service 312. For instance, if another service 312 has lax security features and, as a result, is vulnerable to cyber-attacks, the authentication module 302 may forego selecting the other service 312 for authentication of the user. The information regarding the user's computing devices 310 and other services 312 and specified in the fields 306, 308 of the customer profile 304 may be provided by the user as part of a registration process for the computer-facilitated service, whereby the user may be instructed to access the computer-facilitated service using each computing device 310. Further, the user may indicate, in the registration process, any other services 312 that the user utilizes.

If additional authentication of the user is needed, the authentication module 302 may select, from the entries in the computing device field 306 and the services field 308, another authentication provider that may be used to authenticate the user. This may include selecting a computing device 310 or other service 312 that is to authenticate the user. Further, the authentication module 302 may select the authentication method that is to be used by the other authentication provider to authenticate the user. The authentication module 302 may transmit a request to the selected computing device 310 or other service 312 to perform the selected authentication method and to provide an authentication decision that can be used to determine whether the user's request to access one or more resources of the computer-facilitated service can be fulfilled. Based at least in part on the authentication decision received from the computing device 310 or from the other service 312, the authentication module 302 may determine whether the user can be successfully authenticated. If additional authentication is required, the authentication module 302 may evaluate the computing device field 306 and the services field 308 of the customer profile 304 to select another method of authentication and transmit a request to the computing device 310, to the other service 312, or to other devices and services to perform the selected authentication method. Alternatively, if the authentication module 302 determines that the user has been authenticated and no further authentication is required, the authentication module may transmit a notification to the one or more content servers to fulfill the user's request.

Figure 4:
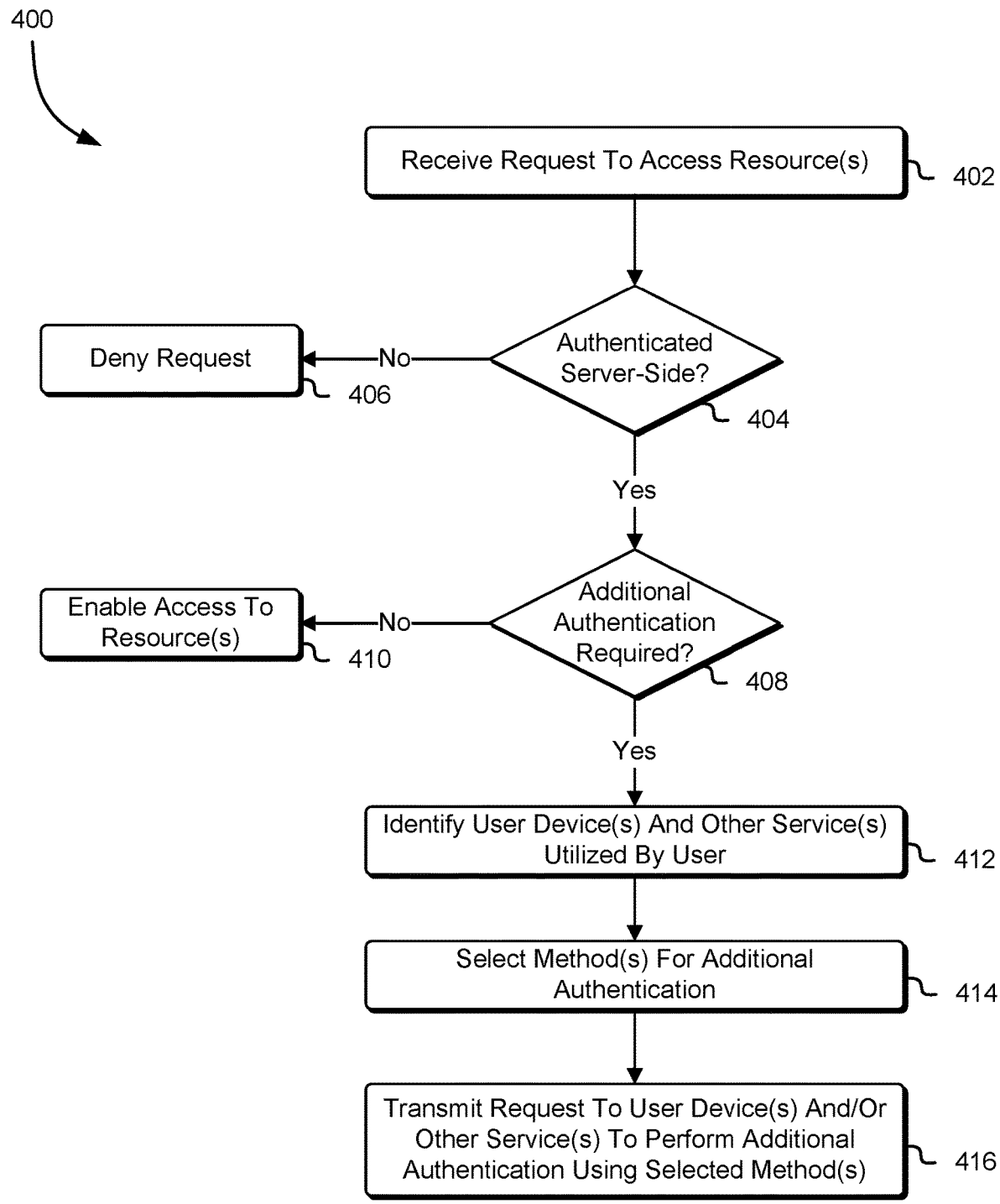
FIG. 4 shows an illustrative example of a process for selecting an authentication method to be executed by a user's computing device or another service for authentication of the user in accordance with at least one embodiment.

As noted above, a computer-facilitated service may receive a request from a user to access one or more resources provided by the computer-facilitated service. In response to the request, the computer-facilitated service may use its authentication provider to authenticate the user. In some instances, if the user is authenticated by the authentication provider, the computer-facilitated service may select another authentication provider, which may be on a user's computing device or used by another service utilized by the user, to execute an authentication method selected by the computer-facilitated service to determine whether the user can be authenticated using this method. Accordingly, FIG. 4 shows an illustrative example of a process 400 for selecting an authentication method to be executed by a user's computing device or another service for authentication of the user in accordance with at least one embodiment. The process 400 may be performed by any computer-facilitated service, in conjunction with an authentication provider of the computer-facilitated service, which may perform an initial authentication of the user.

The computer-facilitated service may provide users with access to one or more computing resources or other resources that may be utilized by these users for their business or personal needs. At any time, the computer-facilitated service may receive 402 a request from a user to access one of more resources provided by the computer-facilitated service. The request may specify identifying information usable to identify the user's customer profile. Further, the identifying information may include credential information that may be used to perform an initial authentication of the user. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like.

The computer-facilitated service, via an authentication provider (e.g., authentication module or other authentication service), may determine 404 whether the user can successfully authenticated. For instance, the authentication provider may evaluate the provided credential information to determine whether the credential information is valid and, if so, whether the credential information provided corresponds to the user that provided the credential information in its request. If the authentication provider is unable to authenticate the user, the authentication provider may transmit a notification to the computer-facilitated service to deny 406 the user's request to access the one or more resources.

If the user is authenticated by the authentication provider of the computer-facilitated service, the computer-facilitated service may determine 408 whether additional authentication is required for the user. For instance, based at least in part on the resources selected by the user, the computer-facilitated service may require additional authentication before enabling the user to access these resources. Alternatively, the user's customer profile may specify that additional authentication is required for the user in order to enable the user to access the requested resources. In some instances, the computer-facilitated service may require additional authentication for all requests. If the computer-facilitated service determines that no additional authentication is required, the computer-facilitated service may enable 410 the user to access the requested resources.

If the computer-facilitated service determines that additional authentication is required, the computer-facilitated service may access the user's customer profile to identify 412 one or more computing devices and/or other services utilized by the user. As described above, a user's customer profile may specify a computing devices field that specifies one or more computing devices utilized by the user. Each entry in the computing devices field may specify an identifier for the corresponding computing device, the hardware and software configuration of the computing device, and the authentication methods available to the computing device for authenticating the user via the authentication providers of the computing device. For each of these authentication methods, the customer profile may specify a score that may be used to determine the efficacy of the authentication method for the particular request. Similarly, the customer profile may specify a services field that specifies one or more other services utilized by the user. The services field may include an entry for each other service utilized by the user. Each entry may specify an identifier for the corresponding other service, network addresses of the other service that can be used to establish a communications channel with the other service, and the authentication methods utilized by authentication providers of the other service, as well as other information that may be used to determine the security level of the other service.

Based at least in part on the entries specified in the user's customer profile, the computer-facilitated service may select 414 one or more authentication methods to be performed by one or more computing devices and/or other services utilized by the user. For instance, the computer-facilitated service may select one or more computing devices and/or other services utilized by the user from the user's customer profile. The computer-facilitated service may evaluate the entries corresponding to the selected one or more computing devices and/or other service to select the authentication methods that may be executed by the selected one or more computing devices and/or other services. In some instances, the computer-facilitated service may select an authentication method and identify any computing devices or other services that may execute the selected authentication method. From these identified devices or services, the computer-facilitated service may select a subset of computing devices and services that are to perform the authentication method selected. The computer-facilitated service may transmit 416 the request to perform additional authentication of the user using the selected one or more methods to the selected computing devices and/or services. It should be noted that the computer-facilitated service may use alternate methods to cause the remote authentication providers to perform the selected authentication method. For instance, the computer-facilitated service may transmit the request to perform the selected authentication methods to a server, which may provide the request to the remote authentication providers. Similarly, the computer-facilitated service may add the request to a queue, whereby the remote authentication providers of the computing devices and/or other services may access the queue to obtain the request.

It should be noted that the process 400 may be performed without performing an initial authentication of the user using the authentication provider of the computer-facilitated service. For instance, the user may not be required to provide credential information in its request to access the resources provided by the computer-facilitated service. As a result, the computer-facilitated may rely on the selected one or more authentication methods for authentication of the user without the authentication provider of the computer-facilitated service performing its initial authentication of the user. The process 400 may also be performed in a different order than the one presented in FIG. 4. For instance, in some embodiments, the determination as to whether additional authentication is required for the user can be performed before authentication of the user is performed by the authentication provider of the computer-facilitated service. The request from the user to access the one or more resources provided by the computer-facilitated service may include a cookie that may be used to indicate the identity of the user. The authentication provider of the computer-facilitated service may use the cookie to identify the user and, based at least in part on information specified in the user's customer account, determine whether additional authentication is required for the user using one or more remote authentication providers that are a third party to the computer-facilitated service (e.g., user's computing device, another service, etc.). Thus, the determination as to whether additional authentication for the user is required may be performed prior to the authentication provider authenticating the user based at least in part on credential information provided by the user.

In some embodiments, based at least in part on the request, the computer-facilitated service can determine that multiple-user authentication is required in order to fulfill the request. For instance, if the request to access one or more resources involves resources that are subject to multiple-user authentication, the computer-facilitated service may identify the user devices and other services utilized by the other users that need to be authenticated in order to enable fulfillment of the request. The computer-facilitated service may access the customer profiles for these other users and select the authentication methods to be performed by one or more computing devices and/or other services utilized by the other users. In some instances, the computer-facilitated service may fulfill the request if the other users are successfully authenticated using the selected authentication methods. Alternatively, the computer-facilitated service may fulfill the request if a subset of the other users are successfully authenticated using the selected authentication methods.

Figure 5:
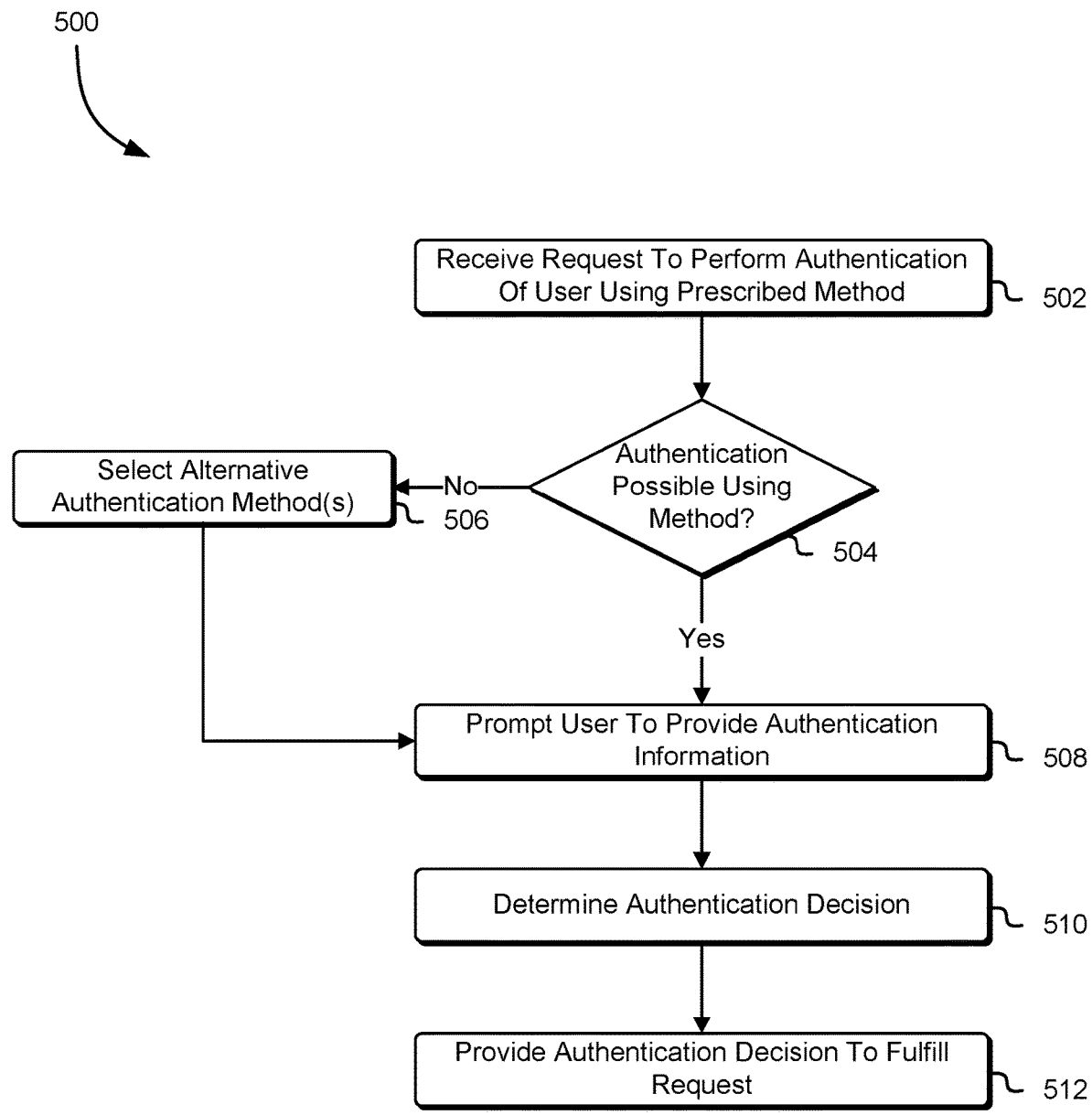
FIG. 5 shows an illustrative example of a process for authenticating a user using an authentication method specified by a computer-facilitated service and providing an authentication decision to the computer-facilitated service in accordance with at least one embodiment.

As noted above, in response to a request from a computer-facilitated service to perform an authentication method selected by the computer-facilitated service, a computing device or other service may utilize its authentication provider to execute the selected authentication method to determine whether the user can be authenticated and generate an authentication decision. In some embodiments, if the authentication provider cannot execute the selected authentication method, the authentication provider selects an alternative authentication method and authenticates the user utilizing this method. The authentication provider may provide an authentication decision generated using this alternative authentication method to the computer-facilitated service, which may determine whether the utilized method is acceptable. Accordingly, FIG. 5 shows an illustrative example of a process 500 for authenticating a user using an authentication method specified by a computer-facilitated service and providing an authentication decision to the computer-facilitated service in accordance with at least one embodiment. The process 500 may be performed by an authentication provider of a computing device or other service selected by a computer-facilitated service to perform a selected authentication method.

At any time, the authentication provider of a computing device or other service utilized by a user of the computer-facilitated service may receive 502 a request to perform authentication of the user using a method prescribed by the computer-facilitated service. For instance, the request may specify that the authentication provider is to obtain and evaluate biometric information corresponding to the user of the computing device or other service to determine whether the user can be authenticated. This may cause the authentication provider to prompt the user to use one or more peripheral devices or other devices to provide the requested biometric information. In response to receiving the request to perform the selected authentication method, the authentication provider may determine 504 whether the selected authentication method may be performed by the authentication provider using the resources of the computing device or other service. For example, if the authentication provider of a computing device determines that one or more peripheral devices usable to obtain biometric information are disabled, and the selected method involves authenticating the user based at least in part on its biometric information, the authentication provider may select 506 an alternative authentication method to be performed by the authentication provider to authenticate the user. Similarly, if the authentication request is transmitted to another service, and the authentication provider of the other service determines that the user's account with that service has been compromised (e.g., the user's credential information for the other service has been compromised), the other service may select 506 an alternative authentication method that involves using multi-factor authentication or other secure methods for authenticating the user.

In some embodiments, if the authentication provider determines that it is unable to perform the prescribed authentication method, the authentication provider transmits a request to the authentication module of the computer-facilitated service to select 506 one or more alternative methods for authenticating the user. For example, in response to a notification from the authentication provider that a camera of the computing device is disabled, thus preventing the authentication provider from executing the prescribed authentication method, the authentication module may select an authentication method that involves analysis of a user's fingerprint via a fingerprint scanner on the computing device. Thus, the authentication provider may execute the alternative authentication method. In some instances, if the authentication module determines that the authentication provider is unable to authenticate the user, the authentication module may select another computing device or service that may authenticate the user. If the authentication provider is unable to authenticate the user and the authentication module of the computer-facilitated service determines that the authentication provider cannot be used for authentication, the process 500 may terminate without generating an authentication decision.

If the authentication provider is able to execute the selected authentication method or has selected an alternative authentication method as a result of the authentication provider not being able to execute the authentication method selected by the computer-facilitated service, the authentication provider may prompt 508 the user to provide authentication information that may be used as input to the authentication method to be used. This may include prompting the user to use a fingerprint scanner on a computing device to provide a fingerprint, placing a camera near the eye of the user to perform a retina or iris scan, taking a picture of the user's face using the camera of a computing device to obtain a facial image of the user for use in a facial recognition scheme, and the like. Alternatively, if the authentication method involves obtaining a password or other code from the user, the authentication provider may prompt the user to enter the password or other code and activate a touchscreen of a computing device to enable the user to enter the password or other code.

Using the authentication information provided by the user, the authentication provider of the computing device or other service may determine 510 an authentication decision and provide 512 this authentication decision to the authentication provider of the computer-facilitated service to fulfill the request from the computer-facilitated service. For instance, if the authentication provider of the computing device or other service is unable to authenticate the user using the provided authentication decision, the authentication provider may generate an authentication decision that specifies that the user could not be authenticated according to the method utilized by the authentication provider. Alternatively, if the authentication provider of the computing device or other service determines that the user has been authenticated based at least in part on the provided authentication information, the authentication provider may generate an authentication decision that specifies that the user was successfully authenticated using the authentication method utilized by the authentication provider. In some embodiments, the authentication provider provides, in the metadata of the notification that specifies the authentication decision, information relating to the authentication method used for authenticating the user. For instance, if the authentication provider utilized an authentication method different from the authentication method selected by the computer-facilitated service, the authentication provider may specify the method used, the inputs used to reach the authentication decision, and rationale for using an alternative authentication method. Alternatively, if the selected authentication method was used, the authentication provider may specify in the metadata that the selected method was utilized, along with the inputs used to establish the authentication decision.

Figure 6:
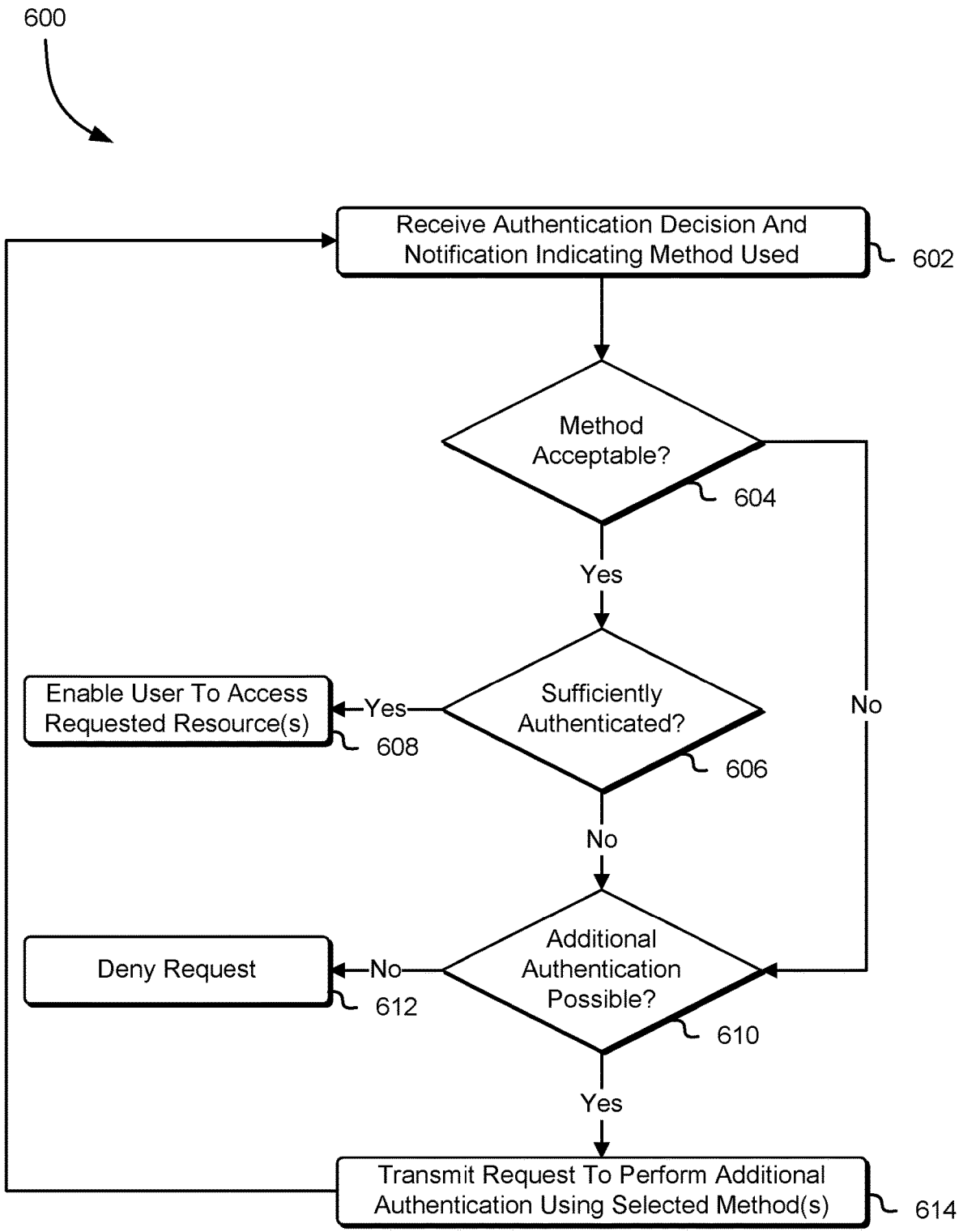
FIG. 6 shows an illustrative example of a process for using an authentication decision from a user's computing device or from another service utilized by the user to determine whether to enable user access to one or more resources in accordance with at least one embodiment.

As noted above, an authentication provider of a computer-facilitated service may evaluate an authentication decision from another authentication provider of a computing device or other service to determine whether a user has been successfully authenticated. For instance, in response to receiving an authentication decision from an authentication provider of a computing device or other service, the authentication provider of the computer-facilitated service may determine whether the other authentication provider utilized the selected authentication method and, if not, whether the alternative authentication method used is acceptable. If the other authentication provider utilized the selected authentication method or has used an acceptable alternative to the selected authentication method, the authentication provider may determine whether the user has been authenticated successfully by the other authentication provider. If so, the authentication provider may enable the user to access the requested resources provided by the computer-facilitated service. Accordingly, FIG. 6 shows an illustrative example of a process 600 for using an authentication decision from a user's computing device or from another service utilized by the user to determine whether to enable user access to one or more resources in accordance with at least one embodiment. The process 600 may be performed by an authentication provider of a computer-facilitated service.

In response to a request to a computing device or other service to perform a selected authentication method, the authentication provider of the computer-facilitated service may receive 602 an authentication decision from the computing device or other service. The authentication decision may be specified in a notification from the computing device or other service. This notification may specify, in metadata or within the notification itself, the authentication method used by the computing device or other service to generate the authentication decision, as well as the inputs used to reach the authentication decision and any rationale for selecting an alternative authentication method, if the authentication method selected by the computer-facilitated service was not used.

Using the notification from the computing device or other service, the authentication provider of the computer-facilitated service may determine 604 whether the authentication method utilized by the computing device or other service is acceptable for use in authenticating the user. For example, if the computing device or other service utilized an alternative authentication method than the one selected by the computer-facilitated service, the computer-facilitated service may evaluate the authentication method utilized by the computing device or the other service against other known authentication methods to determine whether to accept the authentication decision. For example, if the authentication method utilized is subject to numerous vulnerabilities or otherwise is not rigorous enough to prevent false positives, the computer-facilitated service may reject the authentication decision. Further, the computer-facilitated service may determine 610 whether additional authentication methods may be executed by one or more computing devices and/or other services utilized by the user to obtain additional authentication decisions usable to authenticate the user. For example, the computer-facilitated service may access the user's customer profile to identify any other authentication methods that may be performed by the computing device or other service that provided the original authentication decision, as well as other computing devices and services utilized by the user. From these available authentication methods, the computer-facilitated service may select one or more additional authentication methods that are to be performed. The computer-facilitated service may transmit 614 a request to each computing device and/or other service that is to perform the selected authentication methods. If there are no other additional authentication methods available or that can be used to sufficiently authenticate the user, the computer-facilitated service may deny 612 the user's request.

However, if the computer-facilitated service determines that the authentication method utilized by the computing device or other service satisfies one or more criteria established by the computer-facilitated service (e.g., has few vulnerabilities, high success rate in preventing false positives, etc.), the computer-facilitated service may determine 606 whether the user has been sufficiently authenticated in order to enable 608 the user to access the requested resources. As described above, each authentication method specified in a user's customer profile may specify a score that may be used to determine the efficacy of the authentication method for authenticating the user. For the particular request, the computer-facilitated service may select an authentication score that is to be satisfied in order for the user to be authenticated. If, based at least in part on the received authentication decision and other authentication decisions received by the computer-facilitated service, the authentication score satisfies a threshold value, the computer-facilitated service may determine that the user is sufficiently authenticated and enable 608 the user to access the requested resources.

If the user is not sufficiently authenticated, the computer-facilitated service may determine 610 whether additional authentication methods may be executed by one or more computing devices and/or other services utilized by the user to obtain additional authentication decisions usable to authenticate the user, as described above. Thus, if the computer-facilitated service has exhausted the available authentication methods for authentication of the user, the computer-facilitated service may deny 612 the user's request to access the one or more resources provided by the computer-facilitated service. Alternatively, if additional authentication methods are available that can be used to authenticate the user, the computer-facilitated service may transmit 614 a request to each computing device and/or other service that is to perform the additional authentication methods. As the computer-facilitated service receives additional authentication decisions from the computing devices and/or other services utilized by the user, the computer-facilitated service may determine whether the user is sufficiently authenticated and either fulfill or deny the request accordingly.

Figure 7:
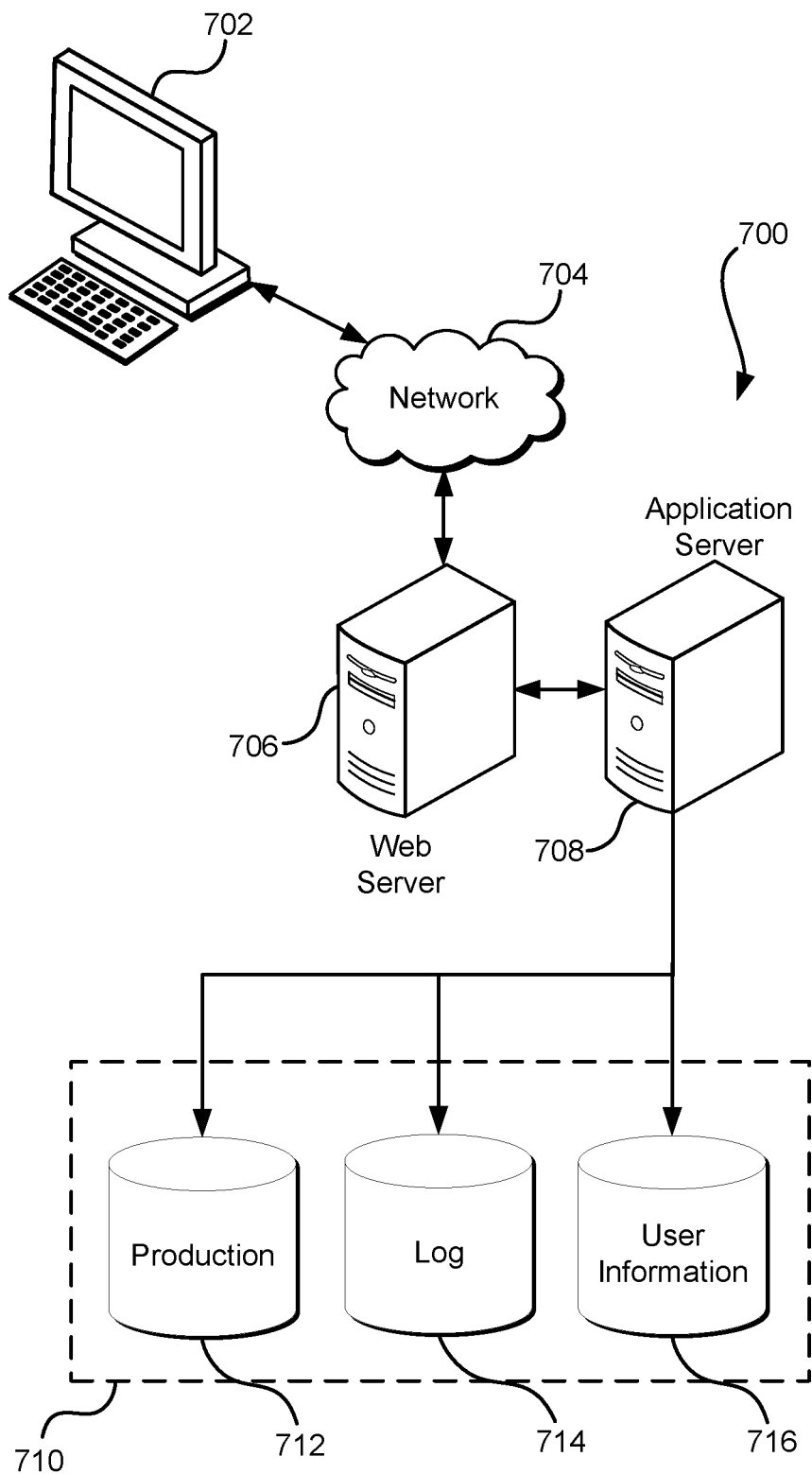
FIG. 7 shows an illustrative example of an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a request from a device associated with an entity to access a resource provided by a computer-facilitated service, the request specifying credential information of the entity;
    determining, at an authentication provider of the computer-facilitated service and based at least in part on the credential information, that the entity is authenticated;
    determining, at the authentication provider, that additional authentication is required;
    in response to determining that the additional authentication is required, identifying a remote authentication provider that is a third party to the computer-facilitated service;
    identifying a plurality of authentication methods performable by the remote authentication provider to authenticate the entity, accessing a profile of the entity to identify the plurality of authentication methods;
    selecting, from the plurality of authentication methods, a first authentication method;
    transmitting a request to the remote authentication provider to perform the first authentication method to generate an authentication decision usable to determine whether the entity is authenticated by the remote authentication provider;
    obtaining, from the remote authentication provider, the authentication decision based on a second authentication method;
    determining, based at least in part on the authentication decision from the remote authentication provider, that:
        the second authentication method is included in the plurality of authentication methods; and
        the entity has been authenticated by the remote authentication provider; and
    providing the entity with access to the resource.

2. The computer-implemented method of claim 1, further comprising:
    obtaining a second request from the device associated with the entity to access an additional resource provided by the computer-facilitated service;
    selecting, from the plurality of authentication methods, a third authentication method;
    transmitting another request to the remote authentication provider to perform the third authentication method;
    receiving a second authentication decision, the second authentication decision generated using an alternative authentication method, whereby the alternative authentication method is different from the third authentication method;
    determining that the alternative authentication method used to generate the second authentication decision is usable to determine that the entity has been authenticated by the remote authentication provider; and
    providing the entity with access to the additional resource.

3. The computer-implemented method of claim 1, wherein the remote authentication provider is installed on the device associated with the entity such that the request to the remote authentication provider is transmitted to the device associated with the entity.

4. The computer-implemented method of claim 1, wherein the first authentication method includes verifying biometric information provided by the entity to the remote authentication provider.

5. A system, comprising at least one computing device configured to implement one or more services, wherein the one or more services:
   obtain a request from a device associated with an entity to access a resource provided by a computer-facilitated service;
   identify a remote authentication provider that is a third party to the computer-facilitated service;
   identify, based at least in part on a profile of the entity, a plurality of authentication methods performable by the remote authentication provider to authenticate the entity;
   select, from the plurality of authentication methods, a first authentication method;
   transmitting an authentication request indicating to the remote authentication provider to perform the first authentication method to generate an authentication decision; and
   determine, based at least in part on the authentication decision from the remote authentication provider, that:
      the entity has been authenticated by the remote authentication provider according to a second authentication method different from the first authentication method; and
      the second authentication method is included in the plurality of authentication methods; and
      provide the entity with access to the resource.

6. The system of claim 5, wherein the one or more services further:
   obtain a second request from the device associated with the entity to access a second resource provided by the computer-facilitated service;
   select a third authentication method to be performed by the remote authentication provider;
   obtain a second authentication decision from the remote authentication provider, the second authentication decision specifying that an alternative authentication method other than the third authentication method was used, the alternative authentication method being different from the third authentication method; and
   determine that the entity has been authenticated by the remote authentication provider as a result of a determination that the alternative authentication method satisfies criteria for authentication methods and that the alternative authentication decision specifies that the entity has been authenticated by the remote authentication provider.

7. The system of claim 5, wherein:
   the remote authentication provider and the plurality of authentication methods performable by the remote authentication provider are specified in a profile of the entity; and
   the one or more services further utilize identifying information corresponding to the entity specified in the request to access the profile.

8. The system of claim 5, wherein:
   the remote authentication provider is installed on the device associated with the entity to access the one or more services; and
   the one or more services further transmit a request to the device associated with the entity to cause the remote authentication provider to perform the first authentication method.

9. The system of claim 5, wherein the one or more services further add a request to perform the authentication method to a queue accessible by the remote authentication provider to cause the remote authentication provider to perform the first authentication method.

10. The system of claim 5, wherein the one or more services further:
    obtain a second request from the device associated with the entity to access a second resource provided by the computer-facilitated service;
    select a third authentication method to be performed by the remote authentication provider;
    obtain a second authentication decision from the remote authentication provider, the second authentication decision specifying that the entity has not been authenticated; and
    deny the second request.

11. The system of claim 5, wherein:
    the request from the entity specifies credential information usable to authenticate the entity; and
    the one or more services further determine, based at least in part on the credential information, that the entity can be authenticated.

12. The system of claim 5, wherein the second authentication method involves multi-factor authentication.

13. A non-transitory computer-readable storage medium storing thereon executable instructions that, as a result of being executed by one or more processors of a computer system, cause the computer system to at least:
    in response to a request from a device associated with an entity to access a resource of a service, identify a remote authentication provider that is a third party to the service and is capable of authenticating the entity;
    select, from a plurality of authentication methods performable by the remote authentication provider, a first authentication method performable by the remote authentication provider to authenticate the entity, the plurality of authentication methods specified in a profile of the entity;
    request the remote authentication provider to perform the first authentication method to generate an authentication decision;
    determine, based at least in part on the authentication decision generated by the remote authentication provider that:
       the entity has been authenticated by the remote authentication provider according to a second authentication method different from the first authentication method; and
       the second authentication method is included in the plurality of authentication methods; and
       provide the entity with access to the resource.

14. The non-transitory computer-readable storage medium of claim 13, wherein the executable instructions further cause the computer system to transmit a request to perform the first authentication method to the device associated with the entity to cause the remote authentication provider to perform the first authentication method, the device associated with the entity having installed the remote authentication provider.

15. The non-transitory computer-readable storage medium of claim 13, wherein the executable instructions further cause the computer system to transmit a request to a server to transmit the first authentication method to the remote authentication provider to cause the remote authentication provider to perform the first authentication method.

16. The non-transitory computer-readable storage medium of claim 13, wherein the executable instructions further cause the computer system to add a request to perform the first authentication method to a queue accessible by the remote authentication provider to cause the remote authentication provider to perform the first authentication method.

17. The non-transitory computer-readable storage medium of claim 13, wherein:
the plurality of authentication methods performable by the remote authentication provider are specified in a profile of the entity; and
the executable instructions further cause the computer system to access the profile of the entity to select, from the plurality of authentication methods, the first authentication method.

18. The non-transitory computer-readable storage medium of claim 13, wherein the first authentication method involves analyzing, at the remote authentication provider, biometric information to determine whether the biometric information corresponds to the entity.

19. The non-transitory computer-readable storage medium of claim 13, wherein the executable instructions further cause the computer system to:
obtain a second request from the device associated with the entity to access a second resource provided by the service;
cause the remote authentication provider to perform a third authentication method;
determine, based at least in part on a second authentication decision generated by the remote authentication provider, that the entity has not been authenticated; and
deny the second request.

20. The non-transitory computer-readable storage medium of claim 13, wherein the executable instructions further cause the computer system to:
obtain a second request from the device associated with the entity to access a second resource provided by the service;
cause the remote authentication provider to perform a third authentication method;
determine, based at least in part on an alternative authentication decision generated by the remote authentication provider, that an alternative authentication method other than the third authentication method was performed; and
fulfill the second request from the entity as a result of a determination that the alternative authentication method satisfies a set of criteria and the alternative authentication decision specifies that the entity has been authenticated by the remote authentication provider.

* * * * *